(12) United States Patent
Chen et al.

(10) Patent No.: US 7,197,754 B2
(45) Date of Patent: Mar. 27, 2007

(54) APPARATUS FOR DETECTING THE OPEN AND CLOSED STATUS OF AN OPTICAL DISK DRIVE

(75) Inventors: Tzu-Nan Chen, Taipei (TW); Hui-Chu Huang, Taipei (TW)

(73) Assignee: Lite-On IT Corporation, Taipei (TW)

( * ) Notice: Subject to any disclaimer, the term of this patent is extended or adjusted under 35 U.S.C. 154(b) by 746 days.

(21) Appl. No.: 10/621,677

(22) Filed: Jul. 17, 2003

(65) Prior Publication Data

US 2004/0052168 A1 Mar. 18, 2004

(30) Foreign Application Priority Data

Sep. 17, 2002 (TW) .............................. 91214675 U

(51) Int. Cl.
*G11B 17/03* (2006.01)
(52) U.S. Cl. ...................................... 720/655; 720/639
(58) Field of Classification Search ...................... None
See application file for complete search history.

(56) References Cited

U.S. PATENT DOCUMENTS 5,365,502 A * 11/1994 Misono ........................ 369/18
6,775,836 B2 * 8/2004 Joung ........................ 720/639
6,826,764 B2 * 11/2004 Fujisawa ..................... 720/610
6,941,568 B2 * 9/2005 Huang ........................ 720/639
2005/0249069 A1 * 11/2005 Aoki et al. .................. 720/655

FOREIGN PATENT DOCUMENTS

JP 2002-015500 * 1/2002 ................. 720/655

* cited by examiner

*Primary Examiner*—Tan Dinh
(74) *Attorney, Agent, or Firm*—Thomas, Kayden, Horstemeyer & Risley

(57) ABSTRACT

An apparatus for detecting an external optical disk drive's open/closed status. The apparatus includes an upper housing, a cover, a solenoid valve sub-assembly, a solenoid valve base, a solenoid valve, a hook device, a torsion spring, an elastic plate, a lower housing, and two wires. When the cover is closed, the convex portion located at the front edge of the cover presses on the torsion spring, and the torsion spring contacts the elastic plate, resulting in an electrically conductive state. When the cover is opened, the torsion spring is released, and the torsion spring disengages from the elastic plate, disconnecting the circuit.

6 Claims, 4 Drawing Sheets

APPARATUS FOR DETECTING THE OPEN AND CLOSED STATUS OF AN OPTICAL DISK DRIVE

BACKGROUND OF THE INVENTION

1. Field of the Invention

The invention relates to a detection apparatus for an external optical disk drive assembly, and more particularly to a detection apparatus without an additional detect switch or photo detector.

2. Description of the Related Art

A conventional external optical disk drive (CD-ROM drive, DVD-ROM etc.) includes a sensor, normally a detect switch or a photo detector, the purpose of which is to inform the internal system whether the cover of the CD-ROM is closed, allowing the internal system to perform subsequent steps.

FIGS. 1 to 2 are perspective diagrams of a cover of a conventional CD-ROM drive in a closed position.

In FIG. 1, a first conventional CD-ROM is provided, with a cover 2a, a solenoid valve 5a, a torsion spring 7a, a motherboard 91a, a wire 10a, and a detect switch 11a. When the cover 2a is closed, the detect switch 11a detects its status, and the wire 10a then electrically connects to the system to enable further function.

In FIG. 2, a second conventional CD-ROM is provided, with a cover 2a, a solenoid valve 5a, a torsion spring 7a, a motherboard 91a, and a photo detector 12a. When the cover 2a is closed, the photo detector 12a detects its status and informs the system to operate or start other functions.

Even though the conventional external CD-ROM with the detect switch 11a or the photo detector 12a can detect the closed or open status of the cover, the addition of the detect switch 11a or photo detector 12a requires extra space and costs.

Thus, there is a need for the shortcomings of the conventional external CD-ROM with additional sensors to be addressed.

SUMMARY OF THE INVENTION

The present invention provides an apparatus to detect an external optical disk drive assembly's open/closed status without an additional detect switch or photo detector.

Accordingly, the present invention provides a detection apparatus for an optical disk drive assembly's open/closed status without an additional detect switch or photo detector, wherein the apparatus provides the detecting function, while minimizing both the volume and the cost of the apparatus.

The apparatus for detecting an external optical disk drive's open/closed status of the present invention comprises an upper housing, a cover, a solenoid valve sub-assembly, a solenoid valve base, a solenoid valve, a hook device, a torsion spring, an elastic plate, a lower housing, and two wires. The cover is disposed above the upper housing. A convex portion is disposed at the front edge of cover with a hook hole thereon. The solenoid valve sub-assembly is fixed under the bottom face of the upper housing. The solenoid valve base comprises a body, a connection part disposed on a side of the body, and a spring support disposed on the other side of the body. A space is located between the connection part and the spring support. The solenoid valve is fixed at the bottom of the solenoid valve base. The hook device is engaged with the connection part of the solenoid valve base. The torsion spring is disposed at the spring support of the solenoid valve base. The elastic plate is disposed within the space of the solenoid valve base. The lower housing, with a motherboard disposed thereon, combines with the upper housing to contain and protect the motherboard and the solenoid valve sub-assembly therein. One end of each wire is connected to the torsion spring and the elastic plate respectively, and the other end is electrically connected to the motherboard. When the cover is closed, the convex portion located at the front edge of the cover presses on the torsion spring, and the torsion spring contacts the elastic plate, resulting in an electrically conductive state. When the cover is opened, the torsion spring is released, and the torsion spring disengages from the elastic plate, disconnecting the circuit.

DESCRIPTION OF THE DRAWINGS

For a better understanding of the present invention, reference is made to a detailed description to be read in conjunction with the accompanying drawings, in which.

DETAILED DESCRIPTION OF THE INVENTION

Figure 1:
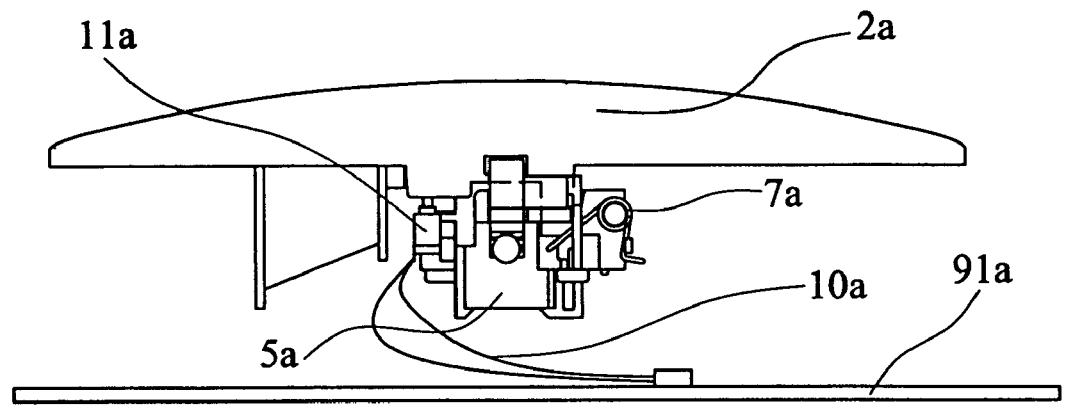
FIG. 1 (Prior Art) is a perspective diagram of the cover of a conventional CD-ROM drive in a closed position (1)
Figure 2:
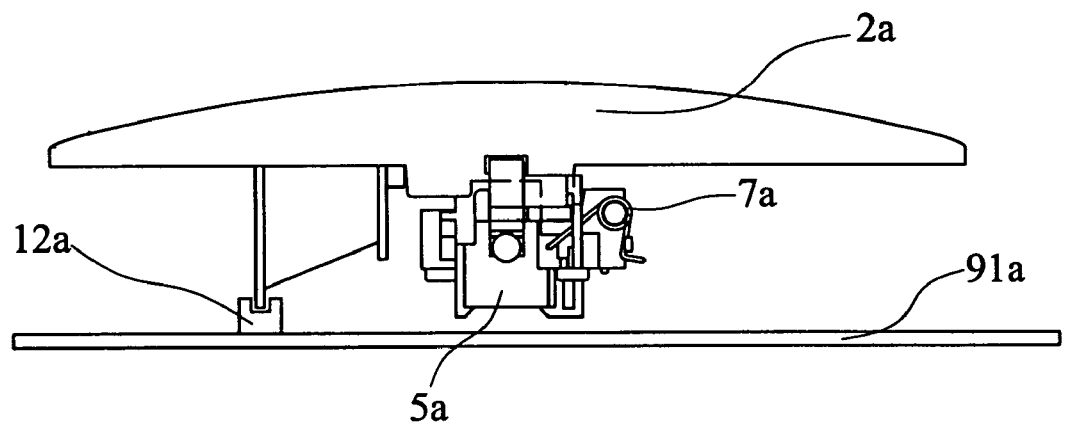
FIG. 2 (Prior Art) is a perspective diagram of the cover of a conventional CD-ROM drive in a closed position (2)
Figure 3:
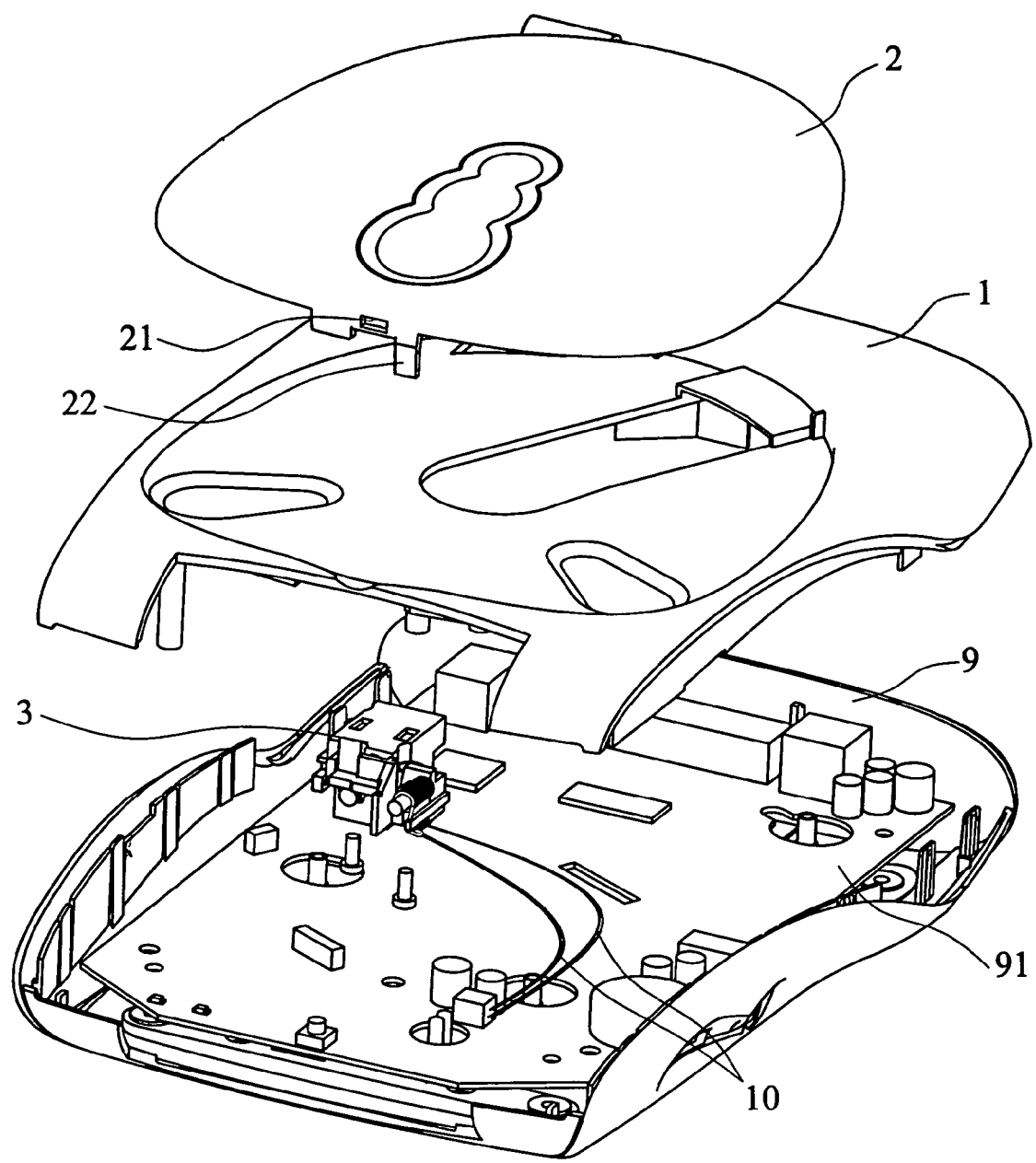
FIG. 3 is an exploded diagram of the present invention.

FIG. 3 is an exploded diagram of the solenoid subassembly of the present invention.

Figure 4:
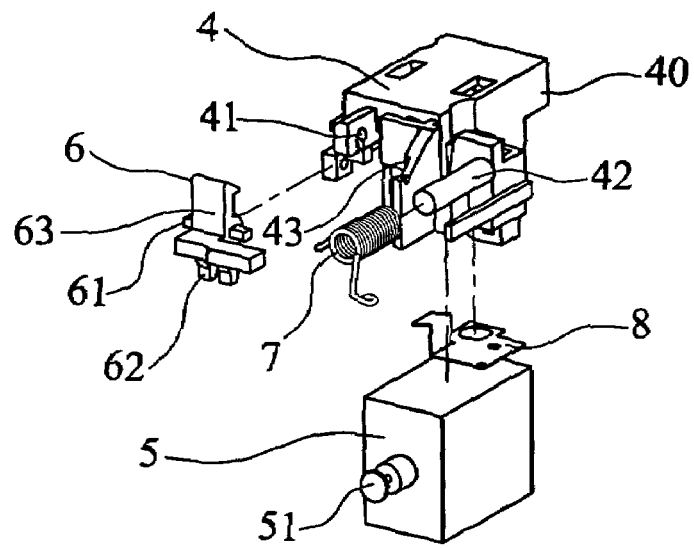
FIG. 4 depicts the solenoid sub-assembly of the present invention.
Figure 5:
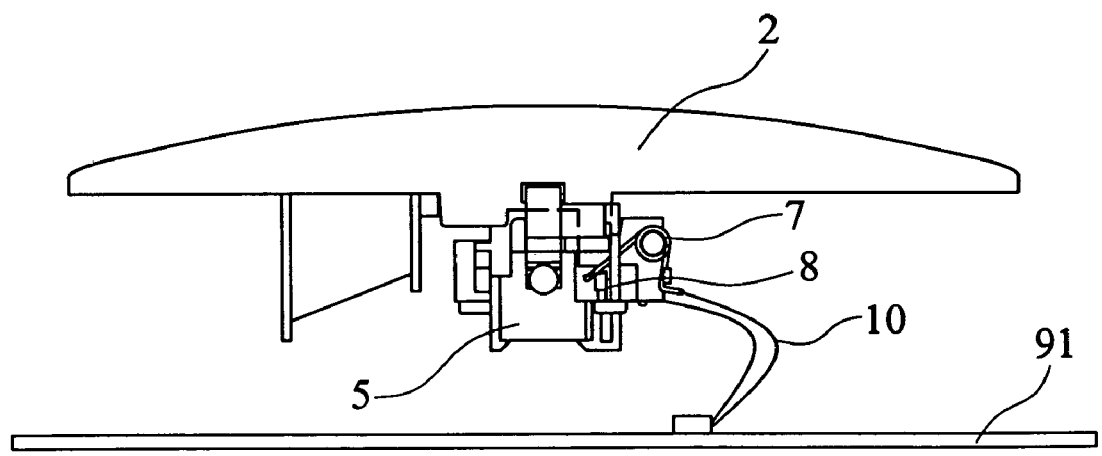
FIG. 5 is a perspective diagram of the cover of a CD-ROM drive in accordance with the present invention, in a closed position.
Figure 6:
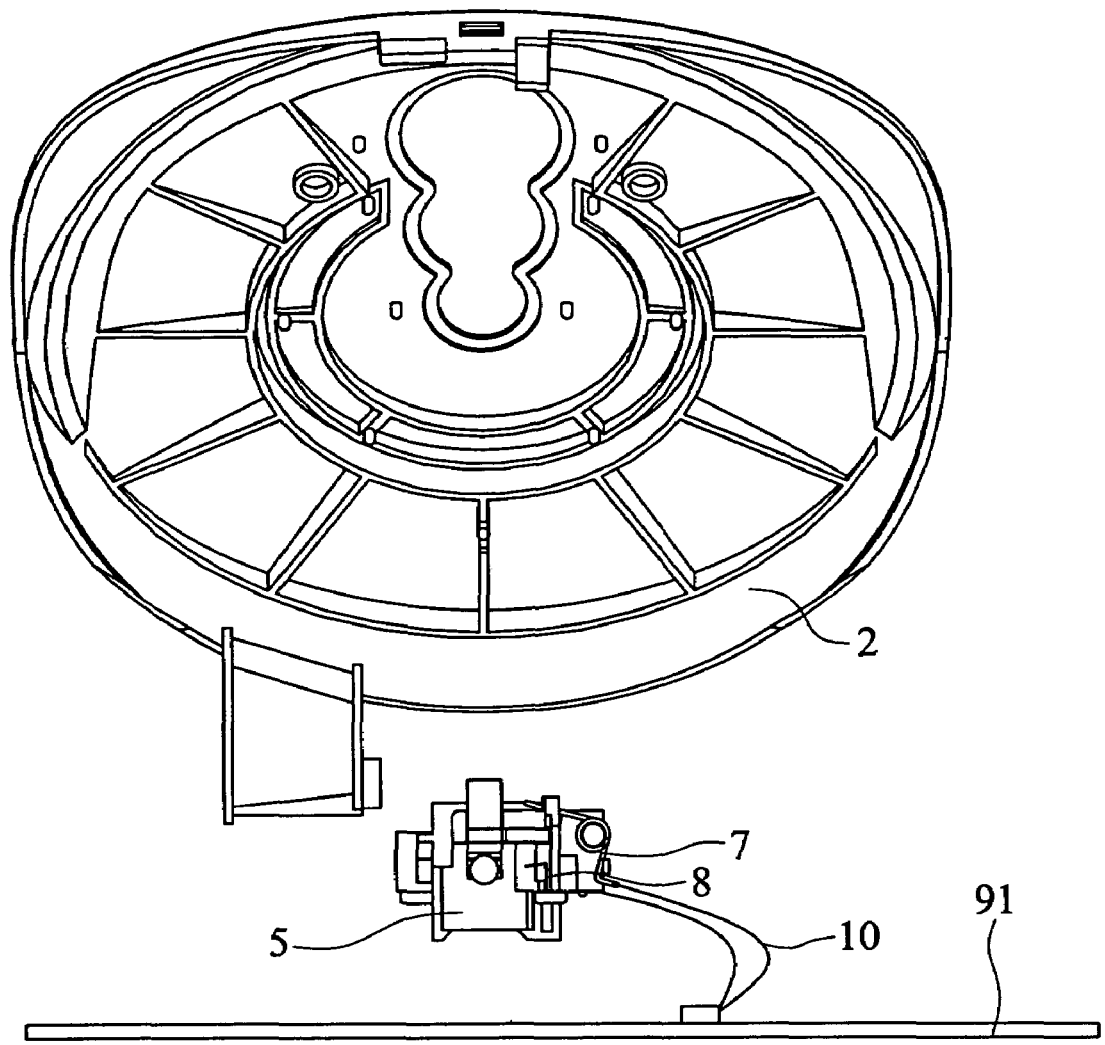
FIG. 6 is a perspective diagram of the cover of a CD-ROM drive in accordance with the present invention, in an open position.

FIG. 4 depicts the solenoid sub-assembly of the present invention;

In FIGS. 3 and 4, the apparatus includes an upper housing 1 with a hinge located at the back edge thereof (not shown). The apparatus further comprises a cover 2, a solenoid valve sub-assembly 3, a solenoid valve base 4, a solenoid valve 5, a hook device 6, a torsion spring 7, an elastic plate 8, a lower housing 9, and two wires 10. The cover 2 is disposed above the upper housing 1. A convex portion 22 is disposed at the front edge of cover 2 with a hook hole 21 therein. The cover 2 pivots on the hinge (not shown) of the upper housing 1 to movably open and close the cover. The solenoid valve sub-assembly 3 is fixed under the bottom face of the upper housing. The solenoid valve base 4 comprises a body 40, a connection part 41 disposed on a side of the body 40, and a spring support 42 disposed on the other side of the body 40. A space 43 is located between the connection part 41 and the spring support 42. The solenoid valve 5 is fixed at the bottom of the solenoid valve base 4. The front end of the solenoid valve 5 has a retractable shaft 51. The hook device 6 includes a shaft 61, a leg 62, and a hook 63. The shaft 61 is hinged at the connection part 41 of the solenoid valve base 4, and the leg 62 is engaged with the retractable shaft 51 of the solenoid valve 5. The torsion spring 7 is disposed at the spring support 42 of the solenoid valve base 4. The elastic plate 8 is disposed within the space 43 of the solenoid valve base 4. The lower housing 9, with a motherboard 91 disposed thereon, combines with the upper housing 1 to contain and protect the motherboard 91 and the solenoid valve sub-assembly 3 therein. The apparatus further includes two wires 10. One end of each wire 10 is connected to the torsion spring 7 and the elastic plate 8 respectively, and the other end is electrically connected to the motherboard 91. FIG. 5 is a perspective diagram of the cover of a CD-ROM drive in accordance with the present invention, in a closed position. Thus, when the cover 2 is closed (as shown in FIG. 5), the convex portion 22 located at the front edge of the cover 2 presses on the torsion spring 7, and the torsion spring 7 contacts the elastic plate 8, resulting in an electrically conductive state. FIG. 6 is a perspective diagram of the cover of a CD-ROM drive in accordance with the present invention, in an open position. When the cover 2 is opened (as shown in FIG. 6), the torsion spring 7 is released, and the torsion spring 7 disengages from the elastic plate 8, disconnecting the circuit.

The advantage of the present invention is that the apparatus does not require an additional sensor, and thus, the volume and cost of the apparatus are reduced effectively.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for detecting an open and closed status of an optical disk drive, comprising:
    an upper housing;
    a cover, disposed above the upper housing, wherein a convex portion is disposed at the front edge of cover with a hook hole therein;
    a solenoid valve sub-assembly, fixed under the bottom face of the upper housing;
    a solenoid valve base, comprising a body, a connection part disposed on a side of the body, and a spring support disposed on the other side of the body, wherein a space is located between the connection part and the spring support;
    a solenoid valve, fixed at the bottom of the solenoid valve base;
    a hook device, engaged with the connection part of the solenoid valve base;
    a torsion spring, disposed at the spring support of the solenoid valve base;
    an elastic plate, disposed within the space of the solenoid valve base;
    a lower housing, with a motherboard disposed thereon, combined in assembly with the upper housing, to contain and protect the motherboard and the solenoid sub-assembly therein; and
    two wires, wherein one end of each wire is connected to the torsion spring and the elastic plate respectively, and the other end is electrically connected to the motherboard;
    wherein, when the cover is closed, the convex portion located at the front edge of the cover presses on the torsion spring, and the torsion spring contacts the elastic plate, resulting in an electrically conductive state; when the cover is opened, the torsion spring is released, and the torsion spring disengages from the elastic plate, resulting in an electrically non-conductive state.

2. The apparatus for detecting the open and closed status of an optical disk drive of claim 1, further comprising a hinge, disposed at the back edge of the upper housing.

3. The apparatus for detecting the open and closed status of an optical disk drive of claim 2, wherein the cover pivots on the hinge of the upper housing to open and close.

4. The apparatus for detecting the open and closed status of an optical disk drive of claim 1, wherein the solenoid valve further comprising a retractable shaft.

5. The apparatus for detecting the open and closed status of an optical disk drive of claim 4, wherein the hook device includes a shaft, a leg, and a hook, and the shaft is hinged at the connection part of the solenoid valve base, and the leg is engaged with the retractable shaft of the solenoid valve.

6. An apparatus for detecting an open and closed status of an optical disk drive, comprising:
    a housing having an opening;
    a cover, disposed on the housing for covering the opening;
    a torsion spring, disposed on the housing for providing an elastic force to open the cover;
    an elastic plate, disposed on the housing;
    a motherboard, disposed in the housing;
    two wires, wherein one end of each wire is connected to the torsion spring and the elastic plate respectively, and the other end is electrically connected to the motherboard;
    wherein, when the cover is closed, the cover presses on the torsion spring, and the torsion spring contacts the elastic plate, resulting in an electrically conductive state between the two wires;
    wherein, when the cover is opened, the torsion spring is released and separated from the elastic plate, resulting in an electrically non-conductive state between the two wires.

* * * * *